UNITED STATES PATENT OFFICE.

GILBERT RIGG, OF PALMERTON, PENNSYLVANIA, ASSIGNOR TO THE NEW JERSEY ZINC COMPANY, OF NEW YORK, N. Y., A CORPORATION OF NEW JERSEY.

METHOD OF RENDERING LITHOPONE LIGHT-PROOF.

1,260,811.   Specification of Letters Patent.   Patented Mar. 26, 1918.

No Drawing.   Application filed April 28, 1916.   Serial No. 94,260.

*To all whom it may concern:*

Be it known that I, GILBERT RIGG, a subject of the King of Great Britain, residing at and whose post-office address is Palmerton, Carbon county, State of Pennsylvania, have invented certain new and useful Improvements in Methods of Rendering Lithopone Light-Proof; and I do hereby declare the following to be a full, clear, and exact description of the invention, such as will enable others skilled in the art to which it appertains to make and use the same.

The present invention is based upon the discovery that the darkening of lithopone when exposed to sunlight, is due mainly, if not entirely, to the presence therein of zinc sulfate as an incident to the manufacture, and that the elimination of the zinc sulfate from the lithopone composition imparts to the lithopone light-resisting properties.

My investigations have shown that in that stage of the manufacture wherein the barium sulfid and zinc sulfate employed for the production of lithopone react to produce barium sulfate and zinc sulfid, small quantities of the zinc sulfate are deposited with the precipitate and are seemingly occluded in a manner which partakes of the character of adsorption or solid solution. This occlusion is so persistent that it offers effective resistance to the washing out of the zinc sulfate to any degree approximating completeness, within time limits which can be regarded as commercial. Moreover, in the subsequent step of furnacing the precipitated mixture of barium sulfate and zinc sulfid, in the retorts provided for that purpose, there is a tendency to conversion of small quantities of the zinc sulfid constituent into zinc sulfate, because of conditions which may prevail in the retorts.

These two sources of zinc sulfate production in the mass are usually cumulative and persistent, for the reason that, when once formed, there is nothing in the ordinary process of lithopone manufacture to cause the subsequent breaking up of the zinc sulfate, either by reduction or dissociation,— the temperature in the furnacing operation being below the dissociation temperature of the zinc sulfate, and the stages of the manufacture of the lithopone after the furnacing operation being without effect upon the occluded or adsorbed zinc sulfate.

In so far as I am aware, it has not heretofore been known that the presence of zinc sulfate in the final lithopone product was a source of darkening thereof upon exposure to sunlight. In ascertaining that fact, moreover, I have likewise discovered that the presence of even very minute percentages of zinc sulfate in the lithopone is accompanied by the darkening effect, and that the state of physical association of the zinc sulfate with the constituent parts of the lithopone is so intimate and characteristic that a special method of presenting the decomposing agent for the zinc sulfate is required in order to effect the substantially quantitative elimination of the zinc sulfate in a commercial way.

To this end, the reagent for effecting the reduction of the zinc sulfate is, in accordance with my invention, ground in with the lithopone composition, after the composition has been subjected to the usual furnacing operation in the customary externally heated retorts. Prior to the grinding operation, however, I prefer to subject the furnaced lithopone composition to a preliminary grinding and washing operation, so as to eliminate from it any soluble impurities which might tend to discolor the reagent employed for the reduction of the zinc sulfate.

I may employ any suitable grinding device of the kind usually employed for the grinding of the furnaced lithopone composition, but I prefer the pebble mill (*i. e.*, the usual porcelain lined iron shell containing pebbles), for the reason that it has a combined squeezing, rubbing and percussive action particularly appropriate to the intimate incorporation of the reagent employed and particularly appropriate to presenting the adsorbed zinc sulfate to complete, homogeneous, searching and intimate physical contact with the reagent.

I find that without lengthening appreciably the time required for the ordinary grinding of the furnaced lithopone, the reagent can be so thoroughly presented to the zinc sulfate occluded therein that not only is it possible to completely decompose the zinc sulfate but to eliminate, by means of the ordinary mill water employed in the grinding operation, any soluble products of the reaction; as, for instance, such soluble products as would be produced if barium sulfid or barium nitrate or other alkaline sulfid or nitrate were used as the decomposing agent.

In the practice of the invention, I prefer to employ a decomposing agent of such a character that the zinc sulfate will either be converted into a soluble compound (as, for instance, into soluble zinc nitrate, when barium nitrate is used) and thereby removed by the mill water, or a reagent which will react with the zinc sulfate to produce insoluble products of the same general nature as the lithopone itself, (as, for instance. zinc sulfid and barium sulfate, when barium sulfid is employed as the reagent). I am aware, however, that it is feasible to employ other reagents than those that I have just mentioned, for the elimination of the zinc sulfate, in the grinding operation, from the physical bond in which it is held in solid solution or adsorption by the furnaced products, as, for instance, the alkali carbonates and phosphates, the alkaline earth nitrates, and others; and, accordingly, I do not wish to be understood as restricting the broad scope of my invention to the use of any particular reagent, but contemplate employing such as are appropriate to the purposes intended.

Having thus described my invention, what I claim is:

1. The method of producing light-resisting lithopone, which comprises decomposing any zinc sulfate contained therein into products inert to light; substantially as described.

2. The method of producing light-resisting lithopone, which comprises removing any zinc sulfate contained therein by grinding with the lithopone a reagent capable of reacting with the zinc sulfate to form light-inert bodies; substantially as described.

3. The method of producing light-resisting lithopone, which comprises removing any zinc sulfate contained therein by subjecting the lithopone composition after it has been furnaced, to a combined squeezing, rubbing and percussive action in the presence of a reagent capable of reacting with the zinc sulfate to form light-inert bodies; substantially as described.

4. The method of producing light-resisting lithopone, which comprises treating calcined lithopone with a reagent adapted to decompose any contained zinc sulfate and form products inert to light; substantially as described.

5. The method of producing light-resisting lithopone from calcined lithopone, which comprises eliminating soluble impurities from the calcined lithopone and then treating with a reagent adapted to decompose any residual zinc sulfate; substantially as described.

6. The method of producing light-resisting lithopone, which comprises removing any zinc sulfate contained therein by grinding the lithopone with a reagent reacting with the zinc sulfate to form a soluble zinc compound; substantially as described.

7. The method of producing light-resisting lithopone, which comprises removing any zinc sulfate contained therein by subjecting the lithopone composition after it has been furnaced to a grinding operation with barium nitrate to convert the zinc into zinc nitrate and to form barium sulfate; substantially as described.

In testimony whereof I affix my signature.

GILBERT RIGG.